United States Patent [19]

Meurs

[11] Patent Number: 5,641,856
[45] Date of Patent: Jun. 24, 1997

[54] CROSS-LINKED RESIN

[75] Inventor: Jan Hermen Hendrik Meurs, Amsterdam, Netherlands

[73] Assignee: Shell Oil Company, Houston, Tex.

[21] Appl. No.: 559,389

[22] Filed: Nov. 15, 1995

[30] Foreign Application Priority Data

Nov. 15, 1994 [EP] European Pat. Off. ............ 94203331

[51] Int. Cl.$^6$ ................................................ C08G 73/10
[52] U.S. Cl. ..................... 528/310; 528/310; 528/322; 528/327; 528/330; 528/331; 528/392; 525/428; 525/431; 525/471; 525/474; 525/540
[58] Field of Search ................................ 528/310, 322, 528/327, 330, 331, 392; 525/428, 431, 471, 474, 540

[56] References Cited

U.S. PATENT DOCUMENTS 2,495,286  1/1950  Brubaker .................................. 528/392
4,024,326  5/1977  Hudgin .................................... 526/11.1

FOREIGN PATENT DOCUMENTS

372602-A  6/1990  European Pat. Off. .
4104319-A  2/1991  Germany .

OTHER PUBLICATIONS

S. Canary and M. P. Steven, Thermally Reversible Crosslinking of Polystyrene via the Furan–Malemide Diels–Alder Reaction, Journal of Polymer Science, pp. 1755–1759.

Y. Chujo, K. Sada, and T. Saegusa, Reversible Gelation of Polyoxaxoline by Means of Diels–Ader Reaction, American Chemical Society, pp. 2636–2641.

*Primary Examiner*—Samuel A. Acquah

[57] ABSTRACT

A re-moldable cross-linked resin comprising polymer chains which are connected to one another via Diels-Alder adducts obtainable from a dienophile and a diene, the latter being a 2,5-dialkyl substituted furan.

15 Claims, No Drawings

CROSS-LINKED RESIN

FIELD OF THE INVENTION

This invention relates to a re-moldable cross-linked resin.

BACKGROUND OF THE INVENTION

Conventional thermoset resin compositions are generally low-molecular weight compounds which are converted into a cross-linked high-molecular weight resin by a curing reaction. Conventional thermoset resins are widely used in view of their generally advantageous properties. For example, they are easily molded into shaped objects of the resins in the uncured state and yet possess high strength and rigidity after curing. On the other hand, as the curing reactions are irreversible, the conventional thermoset resins be re-molded once they have been cured. Thus, they generally lack recyclability.

S. A. Canary et al. (J. Polym. Sci. Part A: Polym. Chem. 30 (1992) p. 1755) disclosed cross-linked resins comprising polymer chains which are connected to one another via Diels-Alder adducts obtainable from a furfural derivative such as a diene and a maleimide as a dienophile. The Diels-Alder adducts are formed from the diene and the dienophile and reverse to the diene and the dienophile when the resins are heated at an elevated temperature. Hence, upon heating at elevated temperature the cross-links disappear, allowing the resin to be re-molded into a shaped object. Practical obstacles to recyclability of the; resin still exist.

Similar cross-linked resins, based on Diels-Alder adducts of (2-furyl)-2-ethyl groups and maleimide groups attached to a polymer back-bone, have been disclosed by Y. Chujo et al. (Macromolecules 23 (1990) p. 2636).

Cross-linked resins based on furfuryl groups attached to a polymer back-bone and a bis-maleimide cross-linking agent have been disclosed in DE-A-4104319. It appears that the resins of this reference need a relatively high temperature for (re)molding. EP-A-372602 discloses a resin which is obtainable by reacting a Diels-Alder adduct of a polymeric 2,5-dialkyl furan and maleic anhydride with an epoxide. The reaction of this Diels-Alder adduct with an epoxide opens the cyclic anhydride of the Diels-Alder adduct and renders thereby the Diels-Alder adduct thermally labile, such that the latter decomposes rapidly to yield the polymeric 2,5-dialkyl furan and maleic acid esters. Hence, the resin composition disclosed in EP-A-372602 is not a re-moldable cross-linked resin as now invented. In the light of the above teaching that furfuryl groups have a relatively low stability, it would be desirable that the resins could be processed at a lower temperature.

SUMMARY OF THE INVENTION

The present invention provides a reversible cross-linking system based on a 2,5-dialkyl substituted furan and a dienophile. It has been found that the Diels-Alder adducts based on a 2,5-dialkyl substituted furan and a dienophile undergo the reverse reaction at a suitably lower temperature than similar Diels Alder adducts based on a furfuryl compound. The cross-linking system of this invention is fast in the cross-linking (i.e. curing) reaction and in the reverse reaction. Furthermore, the re-moldable cross-linked resin of this invention can be re-molded several times without a substantial change in mechanical properties. The resins of this invention can have an attractive glass transition temperature.

The invention therefore relates to a re-moldable cross-linked resin comprising polymer chains which are connected to one another via Diels-Alder adducts obtainable from a dienophile and a diene, the latter being a 2,5-dialkyl substituted furan.

DETAILED DESCRIPTION OF THE INVENTION

There may be several ways by which the polymer chains of the invented re-moldable cross-linked resin can be connected to one another via Diels-Alder adducts. In one embodiment of this invention the 2,5-dialkyl substituted furan groups from which the Diels-Alder adducts are obtainable are attached to or form part of the polymer chains. A cross-linking agent which comprises in its molecular structure two or more dienophiles from which the Diels-Alder adducts are obtainable is also used in this embodiment of the invention. It will be clear that these dienophiles are connected to each other by chemical bonds or by bridging groups. Accordingly, the present invention also relates to a composition which is suitable for the preparation of a re-moldable cross-linked resin which composition comprises a polymer which comprises moieties of a 2,5-dialkyl substituted furan and a cross-linking agent which comprises two or more dienophiles in its molecular structure.

The dienophiles may also be attached to or form part of the polymer chains and use is made of a cross-linking agent which comprises in its molecular structure two or more 2,5-dialkyl substituted furan groups. Therefore, the present invention further relates to a composition which is suitable for the preparation of a re-moldable cross-linked resin which composition comprises a polymer which comprises moieties of a dienophile and a cross-linking agent which comprises two or more 2,5-dialkyl substituted furans in its molecular structure.

In yet another embodiment of this invention the dienophile is attached to the polymer chains to which the 2,5-dialkyl substituted furan groups are also attached or which contain the 2,5-dialkyl substituted furan groups as a part of their polymer chains. Accordingly, the present invention also relates to a polymer which is suitable for the preparation of a re-moldable cross-linked resin which polymer comprises moieties of a 2,5-dialkyl substituted furan and moieties of a dienophile.

The 2,5-dialkyl substituted furans from which the Diels-Alder adducts according to this invention are obtainable may or may not be substituted at their 3- and 4-positions. Preferred substituents are for example alkyl or alkyloxy groups, typically having up to 10 carbon atoms, such as methyl, ethyl, 1-propyl, methoxy and 1-hexyloxy groups.

As indicated hereinbefore, the 2,5-dialkyl substituted furans from which the Diels-Alder adducts are obtainable may be present as groups attached to the polymer chains of the polymer(s) on which the re-moldable cross-linked resin of this invention is based. They may be attached thereto directly via a chemical bond or via a divalent organic bridging group for which any of the substituents of the furans or the 3- or 4-positions of the furans may function as the point of attachment. The alkyl substituents at the 2- and 5-positions of the furans may be the same or different and will typically have up to 10 carbon atoms. Examples of suitable alkyl groups are methyl, ethyl, 2-propyl and 1-hexyl groups. Examples of suitable furyl groups which can be attached to a polymer chain are 2,5-dimethylfur-3-yl, 2,5-diethyl-3-methylfur-4-yl, 5-ethylfurfuryl or 5-(1-butyl) furfuryl groups.

The type of polymer chains to which the 2,5-dialkyl substituted furans may be attached is not critical. Suitably the polymer chains are chains of a polyolefin, such as polyethene, polypropene, polystyrene, poly(acrylic acid) or a copolymer of ethane and acrylic acid or ester, chains of random or alternating copolymers of carbon monoxide and olefinically unsaturated compounds (for a further elaboration on such copolymers cf. hereinafter), or chains which contain heteroatoms, such as chains of polyamide or polyester.

It is preferred that the 2,5-dialkyl substituted furans form a structural element of the polymer back-bone itself. In such a case it is particularly preferred that each of the 2,5-dialkyl substituents of the furans are alkylene groups which also form part of the polymer chain and which may or may not be substituted. Such a constellation can easily be accomplished by furanizing copolymers of carbon monoxide and olefinically unsaturated compounds which contain 1,4-dicarbonyl entities in their polymer chains, i.e. by converting such 1,4-dicarbonyl entities into furan moieties.

Copolymers of carbon monoxide and olefinically unsaturated compounds which contain 1,4-dicarbonyl entities in their polymer chains are known. They can be prepared by palladium catalyzed polymerization using the methods known from, for example, EP-A-121965, EP-A- 181014 and EP-A-516238. The polymers so prepared are alternating copolymers of carbon monoxide and the olefinically unsaturated compounds, i.e. copolymers of which the polymer chains contain the mortomar units originating in carbon monoxide (i.e. carbonyl groups) and the monomer units originating in the olefinically unsaturated compounds in an alternating arrangement so that every fourth carbon atom of the polymer chain belongs to a carbonyl group. Alternative copolymers of carbon monoxide and olefinically unsaturated compounds which contain 1,4-dicarbonyl entities may be random copolymers, i.e. copolymers of which the polymer chains contain monomer units in a random order. The latter copolymers can be prepared by radical initiated polymerization using the methods known from, e.g., U.S. Pat. Nos. 2,495,286 and 4,024,326.

The furanization of the copolymer of carbon monoxide and olefinically unsaturated compounds may be effected by methods known in the art, for example, by applying phosphorus pentoxide as dehydrating agent, as disclosed by A. Sen et al. (J. Polym. Science, Part A. Polym. Chem. 32 (1994) p. 841 ), or by heating in the presence of a strong acid, such as p-toluenesulphonic acid, as disclosed in U.S. Pat. No. 3,979,373. These methods allow the conversion of 1,4-dicarbonyl moieties in the polymer chains into furan moieties at a variable conversion level, depending upon the reaction conditions selected.

It is preferred to employ in the furanization an alternating copolymer of carbon monoxide and olefinically unsaturated compounds because these have a higher content of carbonyl groups in the polymer back-bone so that the furanization can be accomplished efficiently at a high level of incorporation of furan groups. If, nevertheless, a low degree of furanization is desired, the conversion of carbonyl groups into furan groups may be kept low, in which case the presence of unconverted carbonyl groups may contribute advantageously to the mechanical properties of the re-moldable cross-linked resin.

The copolymers of carbon monoxide and olefinically unsaturated compounds may be based on hydrocarbons as the olefinically unsaturated compounds. The olefinically unsaturated compounds may also contain heteroatoms, such as in vinyl acetate, ethyl acrylate and N-vinylpyrrolidone. It is preferred that the copolymer is based on an olefinically unsaturated hydrocarbon, suitably an $\alpha$-olefin, in particular an $\alpha$-olefin having up to 10 carbon atoms. Very suitable are aliphatic $\alpha$-olefins, in particular those having from 3 to 6 carbon atoms and more in particular those having a straight carbon chain, such as propene, 1-butene, 1-pentene and 1-hexene. Propene is most preferred.

It is clear that the type of olefinically unsaturated compound incorporated will determine which substituents may be present at the 3- or 4-positions of the 2,5-dialkyl substituted furans introduced in a furanization reaction. When the copolymer of carbon monoxide and olefinically unsaturated compounds is an alternating copolymer of carbon monoxide and an $\alpha$-olefin having more than three carbon atoms the $\alpha$-olefin may be incorporated in the copolymer in a regio-irregular fashion or in a regioregular fashion. It may be preferred that the $\alpha$-olefin(s) having more than three carbon atoms is/are incorporated in a regio-irregular fashion because this may effect a lower viscosity of the (furanized) copolymer. It may also be preferred to have the $\alpha$-olefin incorporated in a regioregular fashion, notably in a head-to-tail fashion, typically such that the $\alpha$-olefin is incorporated for more than 80%, in particular for more than 90%, in a regioregular fashion. This will ensure that the furan groups introduced in the furanization reaction have the same or virtually the same steric and electronic environment. Thus, these furan groups will be more uniform in reactivity in the Diels-Alder reaction and in the reverse reaction than when the olefinically unsaturated compounds are incorporated in a regio- irregular fashion. This is particularly the case when the copolymer is based on carbon monoxide and a single olefinically unsaturated compound. It is not critical whether or not the $\alpha$-olefin(s) having more than three carbon atoms is/are incorporated in the copolymer in a stereoregular manner. Good results can be obtained with atactic copolymers.

Very good results can be obtained with a furanized regioregular atactic linear alternating copolymer of carbon monoxide with propene wherein the propene is incorporated for more than 90% in a head-to-tail fashion and with a furanized regio-irregular linear alternating copolymer of carbon monoxide with propene.

The precise nature of the dienophile from which the Diels-Alder adduct is obtainable is not critical, as long as the Diels-Alder adduct has such a thermal stability that the cross-linked resin is re-moldable. One skilled in the art will be able to determine by routine experimentation whether or not a dienophile will meet the criterion of re-moldability, n particular in respect of the temperature range he wishes to apply in re-molding the cross-linked resin. Usually the minimum temperature above which the re-moldable cross-linked resin will be re-molded depends on the maximum temperature requirements for the end-use application of the re-moldable cross-linked resin, and vice versa. The re-molding is suitable carried out at a temperature above 80° C., more preferably above 110° C., in particular above 140° C. For reasons of cost-effectiveness and practical processing it is desired that the temperature at which the re-molding takes place is, below 300° C., preferably below 250° C., and more preferably below 220° C.

Suitable dienophiles are, for example, alkynes having electron withdrawing groups attached to both sides of the ethyne moiety, such as ester and keto groups. Examples are mono- and diesters of butynedioic acid (i.e. acetylenedicarboxylic acid) and substituted but-2-yne-1,4-diones. Other suitable dienophiles are compounds which contain a but-2-ene-1,4-dione moiety included in a 5- or 6-membered ring, in particular compounds of the general formula:

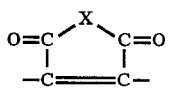

wherein X denotes O, S, N— or P—, wherein at least one of the free valencies is occupied by a bridging group which connects the dienophile with one of the polymer chains or with another dienophile, and wherein the remaining valencies, if any, are occupied by lower alkyl or acyl substituents or, preferably, hydrogen. The lower alkyl substituents suitably contain up to 4 carbon atoms and are, for example, methyl or ethyl groups. Dienophiles of this general formula are preferably cyclic derivatives of maleic arthydride and, in particular, maleimide (i.e. X denotes O or, in particular, N—).

As indicated hereinbefore, in one embodiment of this invention use is made of a cross-linking agent which comprises in its molecular structure two or more dienophiles from which the Diels-Alder adducts are obtainable. The dienophiles may be connected to each other by one or more bridging groups. For example, three dienophiles may be connected to one another by a trivalent bridging group. However, it is sufficient that a cross-linking agent is used in which two dienophiles are connected to one another by a bivalent bridging group. The dienophiles may also be connected to one another by chemical bonds.

Both the molecular weight and the chemical nature of the bridging group of the cross-linking agent may be varied to a large extent. It has been found that such variations of the cross-linking agent lead to re-moldable cross-linked resins covering a wide range of mechanical properties. The bridging group may contain only carbon atoms in the bridge but it is also possible that it contains heteroatoms in the bridge, such as oxygen, silicon or nitrogen atoms. The bridging group may be flexible or rigid.

For example, polymeric bridging groups having flexible polymer chains, such as poly(alkylene oxide) or polysiloxanes, having a number average molecular weight of, say, more than 300, provide rubbery re-moldable cross-linked resins. When the polymeric flexible chain has a number average molecular weight in the order of 1500–5000 or more re-moldable cross-linked resins may be obtained which could replace thermoplastic rubbers.

Accordingly, suitable cross-linking agents of this kind are the bis-maleimido capped poly(alkylene oxide)s, such as poly(ethylene oxide)s or poly(propylene oxide)s, and bis-maleimido capped polysiloxanes, for example the bis-maleimides of polysiloxanes of the general formula $H_2N—CH_2[—O—SiR_2]_n—O—CH_2—NH_2$, wherein n is an integer, on average, of more than 10 and in particular in the range of 20–70, and each R is independently an alkyl group, in particular having up to 5 carbon atoms, preferably a methyl group. Very good results can be obtained with the bis-maleimide of bis-amino capped poly(propene oxide), in particular having a number average molecular weight of at least 300, more in particular in the range of 1500–5000.

Low-molecular weight bridging groups, i.e. bridging groups which typically have up to 20 carbon atoms in the bridge, may also be used. Cycloaliphatic and aromatic bridging groups render the bridging groups rigid. Low-molecular weight cycloaliphatic and aromatic bridging groups tend to provide re-moldable cross-linked resins which are hard and brittle, and have; a relatively high glass transition temperature. Examples of cycloaliphatic and aromatic low-molecular weight bridging groups are groups containing a (nor)bornane skeleton in the bridge, 1,3-phenylene groups and groups of the following formulae: —ϕ—$CH_2$—ϕ—, —ϕ—O—ϕ—O—ϕ—, —ϕ—O—ϕ—$SO_2$—ϕ—O—ϕ— and —ϕ—$C(CH_3)_2$—ϕ—, wherein —ϕ— denotes a 1,4-phenylene group. Other suitable bridging groups are alkylene and oxycarbonyl (ester) groups and combinations thereof. Suitable low-molecular weight cross-linking agents are, for example, the bis-maleimides of hydrazine, 2,4-diaminotoluene, hexamethylenediamine, dodecamethylenediamine, diamines of the general formula:

and bis-amino capped (poly)siloxanes of low molecular weight, such as (poly)siloxanes of the general formula $H_2N—CH_2[—O—SiR_2]_n—O—CH_2—NH_2$, wherein n ranges, on average, from 1 to 10, preferably from 1 to 5 and the groups R are preferably methyl groups. An isomer mixture of the diamines of formula I is commercially available from HOECHST. Very good results can be obtained with bis(4-maleimidophenyl)methane and dimethyl-bis[(N-maleimidomethyl)oxy]silane.

Other suitable cross-linking agents on the basis of maleic anhydride are compounds of the general formula:

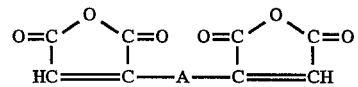

wherein A denotes a bridging group as described hereinbefore, in particular bridging group having up to 20 carbon atoms in the bridge. More in particular the bridging group A is an alkylene group, such as a hexamethylene group, or groups —D—O—CO— or —CO—O—D—O—CO— wherein D denotes a bivalent hydrocarbyl group, for example an alkylene group, such as a hexamethylene group.

Again other suitable cross-linking agents are polyesters based on butynedioic acid and a diol, such as ethylene glycol, a poly(ethylene glycol), propylene glycol or a poly (propylene glycol). These polyesters may be low molecular weight cross-linking agents, such as described hereinbefore, or they may have a number average molecular weight of, for example, more than 400, such as in the range of 2000–6000.

The present invention also relates to cross-linking agents such as bis-maleimido capped poly(alkylene oxide)s, in particular bis-maleimido capped poly(propene oxide)s. Such agents have a number average molecular weight of at least 300, preferably in the range of 1500–5000. The bis-maleimides of (poly)siloxanes have the general formula $H_2N—CH_2[—O—SiR_2]_n—O—CH_2—NH_2$, wherein n is an integer of at least 1 and each R is independently an alkyl group, in particular having up to 5 carbon atoms, preferably a methyl group. The bis-maleimido capped (poly)siloxanes can be prepared by N-hydroxymethylation of maleimide with formaldehyde and subsequent reaction with the appropriate dichlorodialkylsilane in the presence of base and water using generally known methods.

As noted above, certain embodiments of this invention relate to a cross-linking agent which comprises in its molecular structure 2,5-dialkyl furan moieties. In this cross-linking agent the 2,5-dialkyl substituted furan groups are suitably connected to one another via a chemical bond or via a bridging group. The nature of this bridging group is generally the same as the bridging group of the cross-linking agents which comprise two or more dienophiles, as described hereinbefore. Examples of suitable cross-linking agents are bis(5-ethylfurfuryl) adipate and the bis-amides of (5-ethylfurfuryl)oxyacetic acid and the diamines mentioned in the preceding paragraphs.

As noted above, certain embodiments of this invention employ a polymer which comprises 2,5-dialkyl substituted furan moieties and/or moieties of a dienophile. These moieties may be connected to the polymer chains by means of a chemical bond or by means of a bridging group. This bridging group may be of the same type as the bridging groups of the cross-linking agents which comprise two or more dienophiles as described hereinbefore. Examples may be given as follows. When the polymer is a polystyrene, maleimide, as the dienophile, may be attached thereto by tin(IV)chloride catalyzed alkylation of the polystyrene with N-chloromethylmaleimide, and when the polymer is a (styrene/maleic anhydride)copolymer a 5-ethylfurfuryl group may be attached thereto by esterifying the (styrene/maleic anhydride)copolymer with 5-ethylfurfuryl alcohol in pyridine. When the polymer is a copolymer of carbon monoxide and olefinically unsaturated compounds which comprises 1,4-dicarbonyl entities in their polymer chains 2,5-dialkyl-furans and dienophiles may be attached thereto by reacting the copolymer with an appropriately substituted primary hydrocarbylamine, e.g., using the methods known from U.S. Pat. No. 3,979,374. In this reaction 1,4-dicarbonyl entities are converted into pyrrole entities which form part of the polymer chain and which are N-substituted with the substituted hydrocarbyl group. For example, a copolymer of carbon monoxide and olefinically unsaturated compounds which comprise 1,4-dicarbonyl entities may be reacted with the mono-amide of maleic acid and hexamethylenediamine or with the mono-amide of maleic acid and bis(4-aminophenyl)methane, followed by ring closure of the acid-amido moieties to maleimide moieties. This will yield a polymer having N-(6-maleimidohexyl)pyrrole or N-{4-[(4'-maleimidophenyl)methyl]phenyl}pyrrole entities in the polymer chain. When it is desired to use a polymer which contains 2,5-dialkyl substituted furan moieties and moieties of a dienophile a portion of the 1,4-dicarbonyl entities of a copolymer of carbon monoxide and olefinically unsaturated compounds may be converted into furan moieties and another portion of the 1,4-dicarbonyl entities may be converted into N-substituted pyrrole entities, of which the N-substituent comprise a dienophile.

The molecular weight of the polymer(s) on which the re-moldable cross-linked resin of this invention is/are based may vary between wide limits. Suitable molecular weight ranges may be selected according to the type of application and the method of (re-molding of the cross-linked resin envisaged. A low viscosity is very advantageous when reinforced or filled composites, in particular glass reinforced composites, are prepared, in view of a good wetting of the reinforcement or the filler. A low viscosity is also very advantageous, for example, when the resin is used for molding objects with an intricate shape or when it is used as a coating material. In such cases the viscosity, measured at 190° C., is typically lower than 1000 mPa.s, preferably in the range of 5–500 mPa.s and in particular in the range of 10–100 mPa.s. A low viscosity during the (re-)molding can be accomplished e.g. by selecting a polymer with a low molecular weight, and by selecting a low molecular weight cross-linking agent, when used. Good results have been obtained with a polymer having a number average molecular weight in the range of 500–100,000, preferably in the range of 1,000–25,000, in particular in the range of 2,000–10,000. For (co)extrusion and injection molding purposes it may be desirable to apply a resin composition which has a viscosity during the processing, measured at 190° C., higher than 10 Pa.s, preferably in the range of 50–2000 Pa.s, in particular in the range of 100–1000 Pa.s.

The quantity of Diels-Alder adducts present in the re-moldable cross-linked resin of this invention depends on the quantity of 2,5-dialkyl furan groups and the quantity of the dienophile present in the composition from which the Diels-Alder adducts are formed. One skilled in the art will appreciate that a certain minimum quantity of Diels-Alder adducts is needed to be present to effect that the cross-linked resin is a solid material below the temperature at which the Diels-Alder adducts reverse to the 2,5-dialkyl substituted furan and the dienophile. It will also be appreciated that this minimum quantity depends on the molecular weight and the type of the polymer on which the resin is based and, if any cross-linking agent is used, on the number of dienophiles or 2,5-dialkyl furan groups per molecule (i.e. functionality) of the cross-linking agent. Lower molecular weights of the polymer will require a higher quantity of Diels-Alder adducts. The number of a Diels-Alder adducts may be lower when a cross-linking agent is used which has a higher functionality. Generally good results can be achieved by using a polymer having a number average molecular weight of above 1000, which contains on average at least 4 2,5-dialkyl substituted furan groups per molecule. Preferably a polymer is used which has a number average molecular weight of above 2000 and which contains on average at least 1.5, more preferably at least 2.5, and in particular at least 3, 2,5-dialkyl substituted furan groups per molecule. The molar ratio of the 2,5-dialkyl substituted furan groups to dienophiles amounts typically from 10:1 to 1:2, preferably from 5:1 to 1:1, in particular from 3:1 to 1.5:1.

Reinforcements and (conductive) fillers may be present in the re-moldable cross-linked resins of this invention. For example, up to 40% by weight relative to the weight of the resulting composition can be used. Other compounds which may be present are for example radical scavengers, such as phenolic antioxidants, weakly acidic stabilizing systems, such as buffers having a pH range of 2 –7 (when measured in water at 20° C.), UV stabilizers, processing aids, such as release agents, and pigments.

The re-moldable cross-linked resin of this invention can be prepared, for example, by mixing the appropriate components at ambient temperature, heating the obtained mixture and molding into the desired shape. For re-molding of the resin it is generally sufficient to bring the resin at a temperature sufficiently high to convert it into a liquid, to mould the obtained liquid into the desired shape and to cool to a temperature which is sufficiently low to solidify the resin. The present invention also relates to such a re-molding process.

Suitable molding techniques include extrusion, coextrusion (in particular of a soft material upon a hard material), injection molding, resin transfer molding, pultrusion and spraying. Molding repairs and welding can be accomplished in an analogous manner. The time needed to convert the cross-linked resin into a liquid and vice versa is generally short. Frequently this time is shorter than the time needed for the transfer of the heat of reaction.

The ingredients needed to prepare the re-moldable cross-linked resin of this invention can be conveniently stored, handled and used in the form of a kit of parts. A first part of such a kit comprises a polymer which contains moieties of a 2,5-dialkyl substituted furan and a second part of the kit comprises a cross-linking agent which contains two or more dienophiles in its molecular structure. Alternatively, such a kit may comprise a first part comprising a polymer which contains moieties of a dienophile and a second part comprising a cross-linking agent which contains two or more 2,5-dialkyl substituted furans in its molecular structure. The present invention also relates to such kits of parts.

The re-moldable cross-linked resin of this invention can be used in applications in which conventional thermoset resins are used, for example as a pre-preg, a sheet molding compound or a bulk molding compound. Further applications are conceivable, for example, as temporary mould or structure such as a removable kernel in foundries, in disposable goods, as ink or toner, as a (conductive) solder, as a repair material, in coating (in particular seamless high-gloss coating), in thermoreversible gels, as processing aid, as adhesive, as electrical isolation material and as fusible joint or sealant.

The invention is further illustrated by means of the following examples. $^1$H-NMR and $^{13}$C-NMR analysis were carried in deuterochloroform as solvent. The chemical shifts are specified relative to tetramethylsilane. The Shore-A hardness (soft materials) and the Shore-D hardness (hard materials) were determined using a FRANK (trademark) apparatus according to the procedures of DIN 53505 (30 seconds, 20° C.).

EXAMPLE 1

A regioregular atactic linear alternating carbon monoxide/propene copolymer was prepared by copolymerizing carbon monoxide with propene in the presence of a catalyst system based on palladium acetate, cobalt perchlorate, 1,3-bis(diethylphosphino)propane and naphthoquinone.

The product was furanized by treating it with p-toluenesulphonic acid in acetic anhydride.

The polymer obtained had a number average molecular weight of 1000 and 55% of the carbonyl groups was converted into furan groups.

EXAMPLE 2

The procedures of Example 1 were repeated with small modifications.

A polymer was obtained having a number average molecular weight of 7700 and of which 27% of the carbonyl groups was converted into furan groups.

EXAMPLE 3

A regio-irregular linear alternating carbon monoxide/propene copolymer was prepared by copolymerizing carbon monoxide with propene in the presence of a catalyst system based on palladium acetate, cobalt perchlorate, 1,3-bis[bis(2-methoxyphenyl)-phosphino]propane and naphthoquinone.

The product was furanized by treating it with p-toluenesulphonic acid in acetic anhydride.

The polymer obtained had a number average molecular weight of 8500 and 47% of the carbonyl groups was converted into furan groups.

EXAMPLE 4

A bis-maleimido capped poly(propene oxide) was prepared as follows.

A solution of maleic anhydride (11.0 g, 0.11 mole) in 50 ml N,N-dimethylformamide (DMF) was added at room temperature to a stirred solution of a bis-amino capped poly(propene oxide) having a number average molecular weight of about 400 (available under the trademark JEFFAMINE D400) in 250 ml DMF within a period of 1 hour. Stirring was continued overnight. Sodium carbonate (5.3 g, 0.05 mole) was added. The DMF diluent was removed by vacuum flash distillation. Acetic anhydride (40 ml) was added to the residue. The resulting mixture was stirred at 140° C. for 2 hour. The reaction mixture with worked.-up by flashing off the volatiles in vacuum, subsequent extraction using dichloromethane, diethylether and water, and evaporating the organic extract to dryness. The product exhibited $^1$H-NMR signals at 6.58, 4.25, 3.78 and 0.95–1.30 ppm.

EXAMPLE 5

Dimethyl-bis[(N-maleimidomethyl)oxy]silane was prepared as follows.

A mixture of 9.8 g (0.1 mole) maleimide, 9 ml 37% aqueous formaldehyde and 40 mg sodium carbonate was stirred at room temperature for 1 hour. The mixture was diluted with 30 ml water and the crystals formed (9.1 g N-hydroxymethylmaleimide) were collected by filtration.

A mixture of 2.5 g (20 mmole) N-hydroxymethylmaleimide and 1.6 g (20 mmole) pyridine in 50 ml dichloromethane was stirred at room temperature. Dimethylsilyldichloride (1.29 g, 10 mmole) was slowly added and stirring was continued for 20 minutes. The reaction mixture was extracted with water. The organic layer was stirred with 5 g of silica gel and filtered. The filtrate was evaporated to dryness, yielding 2.1 g of nearly colorless product (mp. 65° C.). The product exhibited $^1$H-NMR signals at 0.17 ppm, 5.08 ppm and 6.73 ppm, and $^{13}$C-NMR signals at 3.10 ppm, 60.08 ppm, 134.58 ppm and 169.78 ppm.

EXAMPLE 6

A cross-linked re-moldable resin was prepared as follows.

An intimate mixture of 4 g of the furanized copolymer of Example 1 and 6 g of the bis-maleimide of Example 4 was prepared by stirring a mixture of the components at 20° C. The mixture was placed in a mould and left overnight at ambient temperature.

A rubbery resin molding was obtained which had a Shore-A hardness of 29.

The molding was cut into small pieces and heated at 150° C. for 5 minutes. The liquid thus formed was placed in a mould and cooled to 20° C. within a period of 3 minutes. The molding obtained had a Shore-A hardness of 30.

EXAMPLE 7

A cross-linked re-moldable resin was prepared as follows.

An intimate mixture of 12 g of the furanized copolymer of Example 1, 6 g of bis(4-maleimidophenyl)methane and 0.05 ml acetic acid, as stabilizer, was prepared by stirring a mixture of the components at 150° C. A part of the mixture was poured into a mould (2×10×50 mm) and the remainder was poured into a cylindrical mold. The contents of both molds were cooled to 20° C. within a period of 3 minutes.

The cylindrical molding had a Shore-D hardness of 83. The molding was milled to a fine powder. The powder was heated to 150° C. to obtain a liquid, which was subsequently poured into a cylindrical mold and cooled to 20° C. within a period of 3 minutes. The molding obtained was subjected again to the same sequence of milling, heating and cooling. The molding finally obtained had a Shore-D hardness of 83.

The 2×10×50 mm molding was tested by Dynamic Mechanical Analysis. Upon temperature increase it was

11 found that the modulus at 108° C. was 50% of the modulus at 25° C. Above 115° C. the stiffness of the sample was negligible.

EXAMPLE 8

A cross-linked re-moldable resin was prepared as follows.

An intimate mixture of 16 g of the furanized copolymer of Example 1 and 4 g of bis(4-maleimidophenyl)methane was prepared by stirring a mixture of the components at 150° C. The mixture was poured into a mold and cooled to 20° C. within a period of 3 minutes.

A solid, hard material was obtained.

EXAMPLE 9

A cross-linked re-moldable resin was prepared as follows.

An intimate mixture of 5.5 g of the furanized copolymer of Example 3 and 0.3 g of dimethyl-bis[(N-malsimidomethyl)oxy]silane from Example 5 was prepared by stirring a mixture of the components at 150° C. The mixture was poured into a cylindrical mould. The molding was cooled to 20° C. within a period of 5 minutes.

A soft molding was obtained which had a Shore-A hardness of 39.

EXAMPLE 10

A cross-linked re-moldable resin was prepared as follows.

An intimate mixture of 4.5 g of the furanized copolymer of Example 3 and 0.5 g of bis(4-maleimidophenyl)methane was prepared by stirring a mixture of the components at 150° C. The mixture was poured into a cylindrical mold. The molding was cooled to 20° C. within a period of 5 minutes.

A tough molding was obtained which had a Shore-A hardness of 86.

EXAMPLE 11

A cross-linked re-moldable resin was prepared as follows.

An intimate mixture of 1.8 g of the furanized copolymer of Example 3 and 0.45 g of bis(4-maleimidophenyl)methane was prepared by stirring a mixture of the components at 165° C. The mixture was poured into a cylindrical mold. The molding was cooled to 20° C. within a period of 5 minutes.

A molding was obtained which had a Shore-D hardness of 83.

The molding was cut into small pieces and heated at a temperature of 165° C. for 10 minutes. The liquid thus obtained was poured into a mould and cooled to 20° C. in 5 minutes. The molding obtained had a Shore-D hardness of 84. This molding was subjected to the same sequence of cutting, heating and cooling. The mold finally obtained had a Shore-D hardness of 88.

EXAMPLE 12

A cross-linked re-moldable resin was prepared as follows.

An intimate mixture of 4.5 g of the furanized copolymer of Example 2 and 0.5 g of bis(4-maleimidophenyl)methane was prepared by stirring a mixture of the components at 150° C. The mixture was poured into a mold. The molding was cooled to 20° C. within a period of 5 minutes.

A hard transparent molding was obtained.

EXAMPLE 13

A purchased sample (0.76 g) of dimethyl 1,4-dimethyl-1,4-epoxycylohexa-2,5-diene-2,3-dicarboxylate (i.e. the Diels-Alder adduct of dimethyl acetylenedicarboxylate and 2,5-dimethylfuran) was heated at 180° C. for 15 minutes in a nitrogen atmosphere. Volatile decomposition products were collected in a cold trap (−80° C.). By $^1$H-NMR and $^{13}$C-NMR analyses it was established that the trapped volatile reaction product was substantially 2,5-dimethylfuran and that the residue substantially contained unconverted starting material and dimethyl acetylenedicarboxylate. Acetylene and dimethyl 2,5-dimethylfurane-3,4-dicarboxylate were not detected.

This experiment shows that a Diels-Alder adduct of a 2,5-dialkylfuran and an alkyne with electron withdrawing groups attached to both sides of the ethyne moiety reverses upon heating to the 2,5-dialkylfuran and the alkyne. The temperature level needed for the Diels-Alder reaction and for the reverse reaction fits with suitable temperature ranges applied in (re-)molding operations. Surprisingly, the other possible reverse reaction, i.e. to acetylene and a 3,4-dicarboxy substituted 2,5-dialkylfuran, appears not to occur. Hence, alkynes having electron withdrawing groups attached to both sides of the ethyne moiety are suitable dienophiles for use in this invention.

I claim:

1. A re-moldable cross-linked resin comprising polymer chains which are connected to one another via Diels-Alder adducts obtained from a dienophile and a diene, comprising a 2,5-dialkyl substituted furan.

2. A resin as claimed in claim 1, remoldable in a temperature range of 110°–250° C.

3. A resin as claimed in claim 1, wherein the dienophile is an alkyne selected from the group consisting of alkynes having electron withdrawing groups attached to both sides of an ethyne moiety, comprising a but-2-ene-1,4-dione moiety in a 5- membered ring, and a but-2-ene-1,4-diene moiety in a 6-membered ring.

4. A resin as claimed in claim 1, wherein the dienophile is a cyclic derivative of maleic anhydride.

5. A resin as claimed in claim 1, further comprising a cross-linking agent selected from the group consisting of, bis-maleimido capped poly(alkylene oxide), bis-maleimido capped (poly)siloxane, -bis-maleimides of hydrazine, 2,4-diaminotoluene, hexamethylenediamine, dodecamethylenediamine, and substituted and unsubstituted diamines of the formula

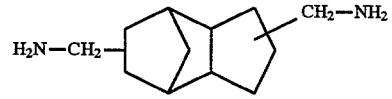

6. A resin as claimed in claim 5, wherein the polymer which comprises moieties of a 2,5-dialkyl substituted furan is obtained by furanizing a copolymer of carbon monoxide and olefinically unsaturated compounds.

7. A resin as claimed in claim 6, wherein the olefinically unsaturated compounds are aliphatic α-olefins.

8. A resin as claimed in claim 7, wherein said α-olefins is propene.

9. A resin as claimed in claim 1 wherein the polymer from which it is obtained has a number average molecular weight in the range of 1,000–25,000.

10. A resin as claimed in claim 1, wherein the polymer from which it is obtained has a number average molecular weight of above 1000 and contains on average at least 4 2,5-dialkyl substituted furan groups per molecule.

11. A resin as claimed in claim 1, wherein the 2,5-dialkyl substituted furan groups and the dienophiles are combined in a molar ratio of from 5:1 to 1:1.

12. A re-moldable cross-linked resin which comprises a polymer which comprises moieties of a 2,5-dialkyl substituted furan and a cross-linking agent which comprises two or more dienophiles in its molecular structure.

13. A re-moldable cross-linked resin which comprises a polymer comprising moieties of a dienophile and a cross-linking agent comprising two or more 2,5-dialkyl substituted furans in its molecular structure.

14. A re-moldable cross-linked resin which comprises moieties of a 2,5-dialkyl substituted furan and moieties of a dienophile.

15. A process for re-molding a cross-linked resin comprising heating a resin as claimed in claim 1 at a temperature which is sufficiently high to convert it into a liquid, molding the obtained liquid into the desired shape and cooling to a temperature which is sufficiently low to solidify the resin.

* * * * *